United States Patent [19]

Takahashi et al.

[11] Patent Number: 5,388,982
[45] Date of Patent: Feb. 14, 1995

[54] INJECTION MOLDING DIE MOUNTED ON AN INJECTION MOLDING MACHINE FOR MOLDING OPTICAL DISC BASE BOARDS

[75] Inventors: Mitsuo Takahashi, Matsudo; Katsuyuki Yasuda, Funabashi; Yasuyoshi Sakamoto, Narita, all of Japan

[73] Assignee: Seikoh Giken Co., Ltd., Chiba, Japan

[21] Appl. No.: 118,402

[22] Filed: Sep. 9, 1993

[30] Foreign Application Priority Data

Mar. 3, 1993 [JP] Japan .................................. 5-069300

[51] Int. Cl.⁶ ............................................ B29C 45/64
[52] U.S. Cl. .................... 425/572; 425/451.9; 425/577; 425/581
[58] Field of Search ............... 425/572, 577, 581, 588, 425/451.9, 408

[56] References Cited

U.S. PATENT DOCUMENTS 4,772,196 9/1988 Asai ...................................... 425/577

Primary Examiner—Tim Heitbrink
Attorney, Agent, or Firm—Spencer, Frank & Schneider

[57] ABSTRACT

An injection molding die for simultaneously molding a plurality of optical disc base boards. The die has a stationary die assembly portion that includes a first base plate having a first center axis, and a plurality of first cavities each having a respective center axis. The first cavities are arranged in an equally spaced relationship along a circumference of a circle coaxial with the first center axis. The die also has a movable die assembly portion that includes a second base plate having a second center axis, and a plurality of second cavities each having a respective center axis. Each second cavity positionally corresponds to a respective first cavity. The first center axis is aligned with the second center axis using a guide rod fixedly secured to the first base plate and that extends along the first center axis, and by using a guide member that extends along the second center axis to be positionally coincident with the first center axis. The guide member has a guide hole formed therein for receiving the guide rod. Each respective first cavity center axis is additionally aligned with each corresponding respective second cavity center axis.

6 Claims, 6 Drawing Sheets

INJECTION MOLDING DIE MOUNTED ON AN INJECTION MOLDING MACHINE FOR MOLDING OPTICAL DISC BASE BOARDS

BACKGROUND OF THE INVENTION

1. Field of the Invention

The present invention relates generally to an injection molding die mounted on an injection molding machine for molding a plurality of optical disc base boards or the like simultaneously. More particularly, the present invention relates to an improvement of an injection molding die of the foregoing type which ensures that a number of optical disc base boards or the like can be accurately produced without influence from the thermal expansion of the injection molding die due to the temperature difference between a die assembly on a stationary side and a die assembly on a movable side.

2. Description of the Related Art

To produce a large number of optical discs or tile like on a mass production basis, there has been a need for providing an injection molding die that can simultaneously mold a plurality of products at a time. To satisfy the foregoing need, a variety of experiments have been conducted on an actual machine basis to develop an injection molding die which ensures that a plurality of optical disc base boards are simultaneously molded. However, information on successful results obtained from these experiments was not reported until now.

When a plurality of die cavities are simultaneously used for an injection molding operations, there arises the following significant problem. The center axes of adjacent die cavities are positionally offset from each other. This is due in part to differences of thermal expansion between a die assembly on the movable side and a die assembly on the stationary side which is a result of die temperature variations caused during a series of injection molding operations. This is also due to inexact movement of a platen on the movable side mounted on an injection molding machine.

Figure 7:
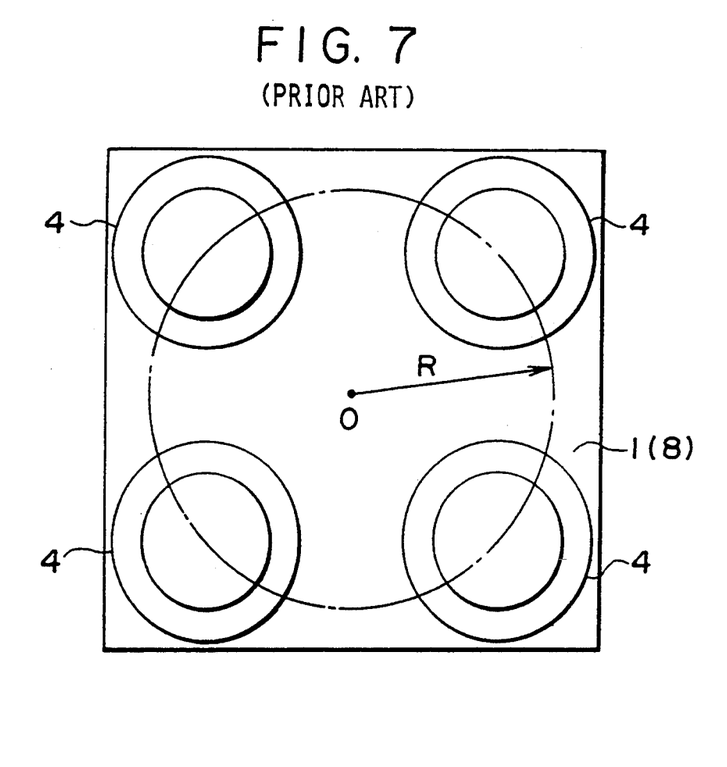
FIG. 7 is a front view of a die assembly on the stationary side and a die assembly on the movable side on a conventional injection molding die for simultaneously molding four optical disc base boards.
Figure 8:
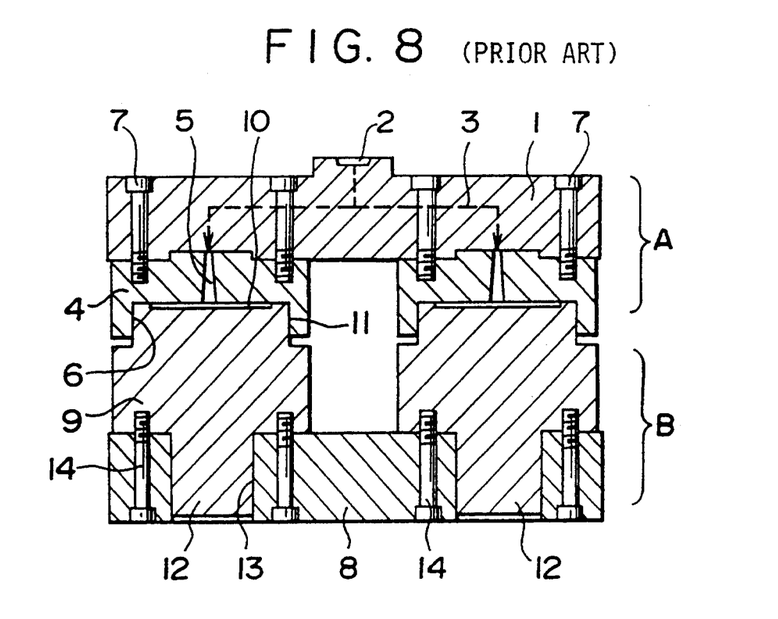
FIG. 8 is a sectional side view of the conventional injection molding die.

To obviate the foregoing problem, tile inventors carried out various examinations with a typical conventional injection molding die, as shown In FIG. 7 and FIG. 8, for simultaneously molding four optical disc base boards.

To facilitate understanding of the present invention, the conventional injection molding die will be described below with reference to FIG. 7 and FIG. 8.

FIG. 7 is a front view of the injection molding die, particularly showing how four die cavities are arranged oil a die assembly oil the stationary side. FIG. 8 is a sectional side view of the injection molding die shown in FIG. 7. In practice. More components than that shown In tile drawings are employed in the injection molding die, but only essential components are shown for of simplification of illustration.

In FIG. 8, reference character A designates a die assembly on the stationary side. The die assembly A includes a base plate 1 which is fixedly mounted on a stationary platen (not shown) of an injection molding machine.

A quartered hot runner block (not shown) is incorporated in tile base plate 1. A molten resin infeed hole 2 is formed along a center axis of the base plate 1 for feeding a molten resin through four molten resin flow holes 3 and into four cavities 4.

An injection hole 5 is formed along the center axis of each of the four cylindrical cavities 4. In addition, to ensure that the center axis of each cavity 4 is correctly located ill alignment with the center axis of an opponent cavity 9 on the movable side, a female cylindrical guide surface 6 is formed around an inner periphery of the cavity 4.

The respective cavities 4 are fixedly mounted on the base plate 1 by tightening a plurality of bolts 7 that are circumferentially located in an equally spaced relationship on the locus of a circle having a radius R, as measured from a center point O of the base plate 1.

In FIG. 8, reference character B designates a die assembly oil the movable side. The die assembly B includes a base plate 8 which Is fixedly mounted on a platen (not shown) of the injection molding machine on the movable side.

Four cavities 9 on the movable side are fixedly mounted on the base plate 8 by tightening a plurality of bolts 14. Each cavity 9 has a small depth, and a bottom surface 10. Each cavity 9 includes a cylindrical male guide surface 11 which fits exactly into the cylindrical female guide surface 6 of the opponent cavity 4. An ejector bush, a hole cutting punch, an ejector pin and a mechanism for actuating these components (not shown) are incorporated In a cylindrical projection 12 which is integral with each cavity 9.

The cylindrical projection 12 is inserted into a hole 13 which is formed through the base plate 8.

The aforementioned conventional injection molding die has the following problems, each of which will be described below with reference to FIG. 9 and FIG. 10.

The first problem is caused by the difference in thermal expansion, which is closely associated with temperature differences between the base plate 1 on the stationary side and the base plate 8 on the movable side.

For the convenience of description, it Is assumed that the base plate 1 has a temperature higher than that of the base plate 8.

Figure 9:
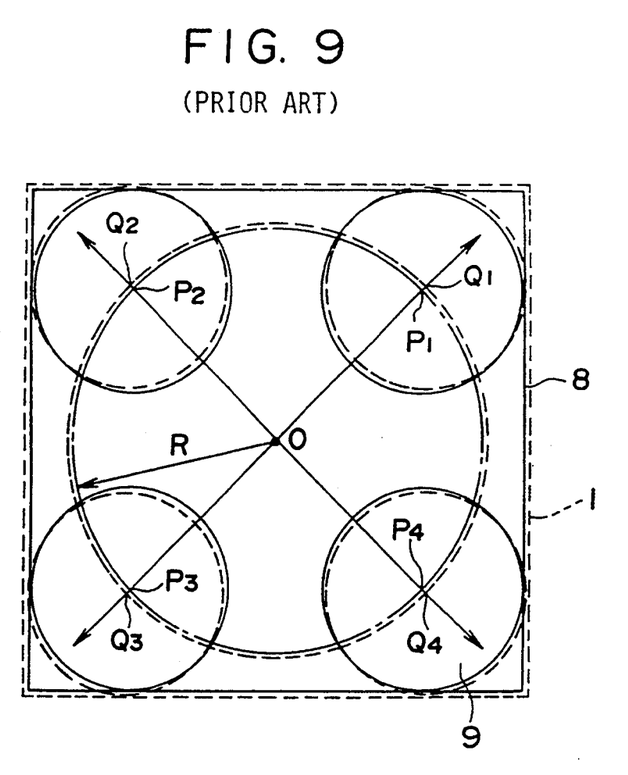
FIG. 9 is a front view of the die assembly on the stationary side and the die assembly on the movable side, particularly showing an exaggerated thermal expansion of both die assemblies during a series of injection molding operations.

As shown in FIG. 9, base plate 1 thermally expands as represented by dotted lines, although the illustrated thermal expansion of base plate 1 is exaggerated for easy understanding.

As base plate 1 thermally expands center points Q1 to Q4 of the cavities 4 are dislocated outward from center points P1 to P4 of the cavities 8. The direction of dislocation of the center points Q1 to Q4 relative to center points P1 to P4 is coincident with the direction of extension of two lines radially extending through the center point 0 of the base plates 1 and 8.

A second problem is attributable to the structure of an injection molding machine. This problem will be described in detail below with reference to FIG. 10.

In the drawing, reference numeral 15' designates a platen on the stationary side, and reference numeral 15 designates a machine frame. The platen 15' and the machine frame 15 are integrated with the injection molding machine.

Four guide rods 16 are fixedly secured to the platen 15' and the machine frame 15. The guide rods 16 extend through bearings 19 that are fit into a platen 17 on the movable side, so that the platen 17 is slideably displaceable in a horizontal direction along the guide rods 16 by activating a driving mechanism 18. An annular clearance Δc is formed between bearing 19 and the opponent guide rod 16.

Figure 10:
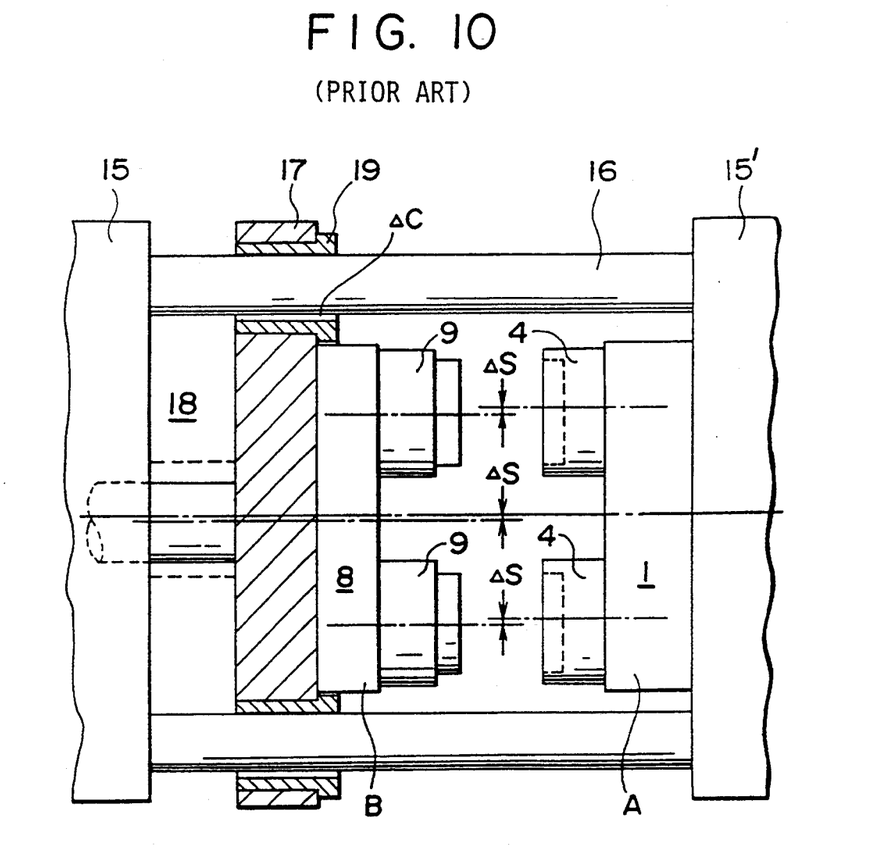
FIG. 10 is a schematic fragmentary side view of an injection molding machine oil which the conventional injection molding die is mounted.

In FIG. 10, reference character A designates a die assembly on the stationary side, and reference character B designates a die assembly on the movable side.

With this construction, when the platen 17 is driven in the horizontal direction it is simultaneously lowered in a vertical direction by its own dead weight and by the weight of the die assembly B by a distance equivalent to the annular clearance $\Delta c$. In other words, the center line of the die assembly B is positionally offset from the center line of the die assembly A by a quantity equivalent to the annular clearance $\Delta c$. Further, since deflection of the guide rods 16 adds to the foregoing downward dislocation of the platen 17, the total quantity of dislocation of the platen 17 amounts to a value of $\Delta S$.

Thus, since the center line of cylindrical male guide surface 11 is positionally offset from the center line of cylindrical female guide surface 6, an abnormally high contact pressure is localized on the cylindrical male guide surface 11. This results in unavoidable damage or injury to each cylindrical male guide surface 6.

For example, if the difference in temperature between the base plate 1 and the base plate 8 is 20° C, and the locus of a circle circumferentially extending through the center points P1 to P4 has a radius R of 150 mm, the deviation of the center axis of the cavity 9 from that of the cavity 4 amounts to about 0.04 mm.

Thus, since it is estimated that the quantity of dislocation $\Delta S$ of the platen 17, derived from the deformation of the injection molding machine, ranges from 0.1 to 0.3 mm, a large load is exerted on the respective cylindrical guide surfaces 6 and 11.

If, for example, an injection molding die for simultaneously molding four optical disc base boards, each having a diameter of 120 mm, is mounted on the injection molding machine, it is estimated that the total weight of the platen 17 and the die assembly B amounts to about 400 Kg. In this case, a surface pressure appearing around each of the cylindrical guide surfaces 6 and 11 is comparatively small, even through the quantity of dislocation $\Delta S$ is large.

As the platen 17 is thermally expanded due to the temperature difference between the base plate 1 and the base plate 8, the platen 17 Is elastically deformed. This causes a high strain in the platen 17, even though the absolute value of dislocation of the platen 17 is very small. Consequently, a very high and intense contact pressure acts on each of the cylindrical guide surfaces 6 and 11.

As is apparent from the above description, in contrast with an injection molding die for molding a single optical disc base board, the aforementioned injection molding die for simultaneously molding a plurality of optical disc base boards can not exactly locate the center axis of each cavity in alignment with the center axes of the base plates of the injection molding die mounted oil the injection molding machine.

In summary, in contrast to the injection molding die for molding a single optical disc base board, the injection molding die for simultaneously molding a plurality of optical disc boards has two problems to be solved: the dimensional dislocation of the base plate on the movable side from the base plate on the stationary side due to unavoidable differences of thermal expansion associated with the temperature difference between the die assembly on the movable side and the die assembly on the stationary side, and the accumulative deviation of the center axis of each die cavity on the movable side from the center axis of each die cavity on the stationary side because of positional disalignment of the center axis of the platen oil the movable side with the center axis of the platen on the stationary side.

SUMMARY OF THE INVENTION

The present invention has been made in consideration of the foregoing background.

An object of the present invention is to provide an injection molding die mounted on an injection molding machine for simultaneously molding a plurality of optical disc base boards or the like wherein a plurality of cylindrical guide surfaces of die cavities on the stationary side can fit exactly into a plurality of opponent cylindrical guide surfaces of die cavities on the movable side so that the optical disc base boards or the like can stably be molded with a high degree of accuracy.

Another object of the present invention is to provide an injection molding die of the foregoing type which ensures that a plurality of optical disc base boards or the like can be accurately molded on the mass production basis at a minimized maintenance cost by not allowing excessive elastic stress to appear on the cylindrical guide surface of each die cavity and associated components of the injection molding die.

A further object of the present invention is to provide an injection molding die of the foregoing type for accurately molding a number of photoelectromagnetic discs using stamper plates each having a predetermined transference pattern.

The present invention provides an injection molding die mounted on an injection molding machine for simultaneously molding a plurality of optical disc base boards or the like wherein a die assembly on the stationary side having a plurality of cavities circumferentially arranged in an equally spaced relationship along the locus of a circle. The circle has a predetermined radius as measured from the center axis of a base plate oil the stationary side. During each molding operation, the die assembly on the stationary side is brought in close contact with a die assembly on the movable side, which has the same number of opponent cavities as the die assembly on the stationary side. The opponent cavities are circumferentially arranged in an equally spaced relationship along the locus of a circle having the same radius as the foregoing circle, and as measured from the center axis of a base plate on the movable side. The injection molding die includes a first aligning unto for correctly locating the center axis of the die assembly on the stationary side in alignment with the center axis of the die assembly on the movable side, and a second aligning unit for correctly locating the center axis of each cavity on the stationary side in alignment with the Center axis of the opponent cavity on the movable side.

Specifically, the first aligning unit comprises a guide rod fixedly secured to the base plate on the stationary side while extending along the center axis of the die assembly on the stationary side, and a guide member having a guide hole formed therein for receiving the guide rod. The guide member extends along the center axis of the die assembly on the movable side, which is positionally coincident with the center axis of the die assembly oil the stationary side.

The second aligning unit comprises a cylindrical projection projecting outward of each cavity on the movable side and a cylindrical hole formed through the base place on the movable side for receiving the cylindrical projection therein with a predetermined annular clearance kept therebetween. The second aligning unit allows each cavity on the movable side to be slidably displaced oil the base plate relative to the opponent cavity on the stationary side, thus cancelling the difference in thermal expansion between the die assembly on the stationary side and the die assembly on the movable side.

In addition, the second aligning unit includes a plurality of first tightening bolts for securing each cavity on the movable side to the base plate on the movable side. A predetermined gap is formed between the bottom of a cylindrical hole for receiving each of the first tightening bolts therein, and the head of each first tightening bolt. The second aligning unit further includes a plurality of second tightening bolts for resiliently securing each cavity on the movable side to the base plate on the movable side with plural sets of cup washer-shaped springs received between the bottom of a cylindrical hole for loosely receiving each of the second tightening bolts and the head of each second tightening bolt.

The first tightening bolts and the second tightening bolts are arranged along the locus of a common circle of which center axis is coincident with the center axis of each cavity on the movable side.

It is preferred that the injection molding die further includes an additional aligning unit which comprises a cylindrical female guide surface formed on each cavity on the stationary side and a cylindrical male surface formed on each cavity on the movable side.

When a number of photoelectromagnetic optical discs are molded using the injection molding die of the present invention, a stamper plate is inserted into each cavity on the stationary side and into each cavity on the movable side. Other objects, features and advantages of the present invention will become apparent from a reading of the following description which has been made in conjunction of the drawings.

BRIEF DESCRIPTION OF THE DRAWINGS

The present invention is illustrated in the following drawings in which.

DESCRIPTION OF THE PREFERRED EMBODIMENT

The present invention will now be described in detail with reference to the accompanying drawings which illustrate a preferred embodiment thereof.

Figure 1:
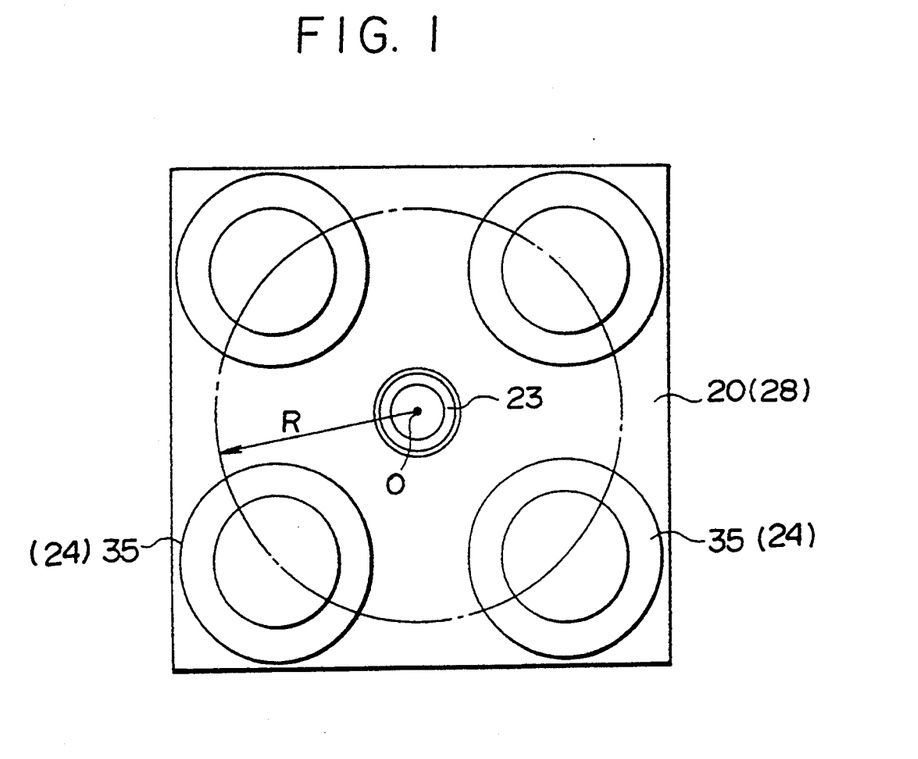
FIG. 1 is a schematic front view of four die cavities formed on a base plate comprising an injection molding die mounted on an injection molding machine for simultaneously molding four optical disc base boards according to an embodiment of the present invention.
Figure 2:
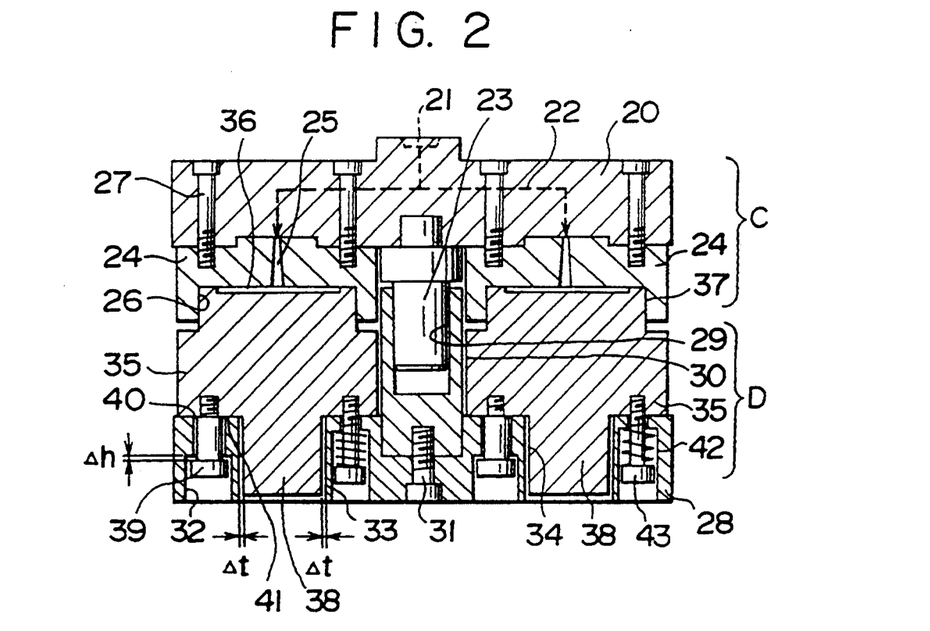
FIG. 2 is a sectional side view of the injection molding die shown in FIG. 1.

FIG. 1 is a front view of an injection molding die for simultaneously molding a plurality of optical disc base boards (four optical base boards in the shown case) at a time according to the embodiment of the present invention. FIG. 1 particularly shows how die cavities are arranged on a base plate, and FIG. 2 is a sectional side view of the injection molding die shown in FIG. 1.

A die assembly C includes a base plate 20 on a stationary side and a molten resin infeed hole 21 formed at the central part of the base plate 20. In addition, a quartered hot runner block (not shown) inclusive of four molten resin flow holes 22 is incorporated in the base plate 20.

A single guide rod 23 having a circular cross-sectional shape is fixedly secured to a lower central part of base plate 20.

In the shown case, four cylindrical cavities 24 are arranged on the base plate 20. A molten resin injection hole 25 is formed at the central part of each cavity 24. In addition, a cylindrical female guide surface 26 is formed around the inner periphery of each cavity 24. Guide surface 26 exactly aligns a center axis of each cavity 24 with a center axis of the opponent cavity 35 on a movable side, which will be described later.

As is best seen in FIG. 1, the centers of the cavities 24 are circumferentially located in an equally spaced relationship on the locus of a circle having a radius R as measured from a center point O of the base plate 20. The respective cavities 24 are fixedly secured to the base plate 20 by tightening a plurality of bolts 27.

Figure 3:
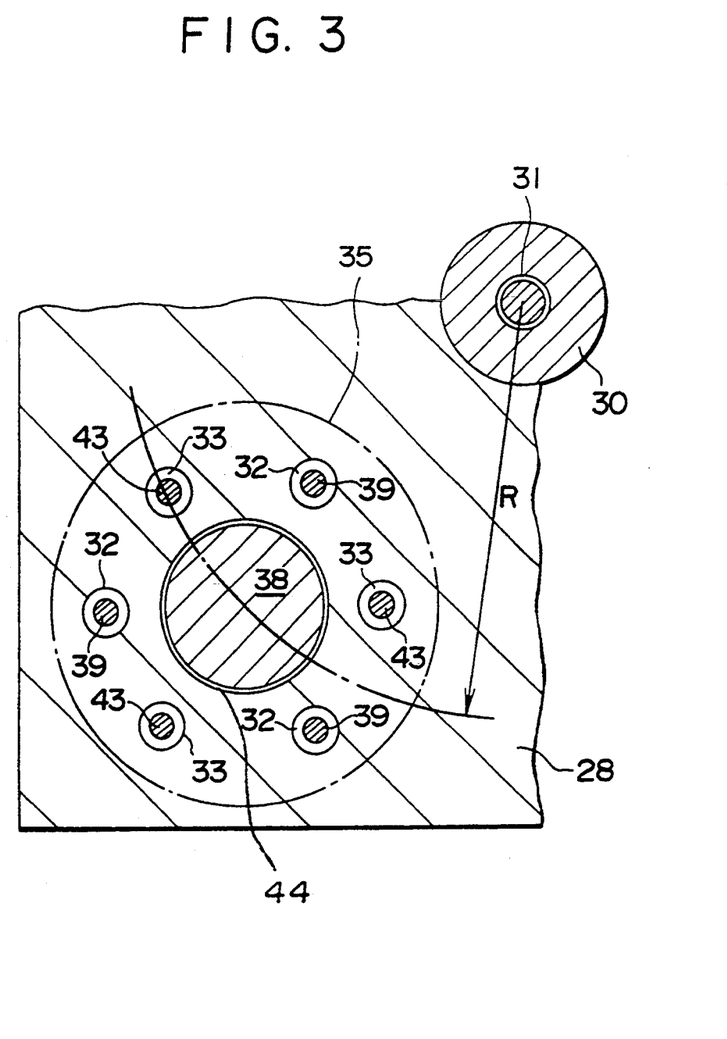
FIG. 3 is a fragmentary front view of the injection molding die shown in FIG. 1, particularly showing the positional relationship between a base plate on the movable side and a die cavity on the movable side.

FIG. 3 is a fragmentary sectional front view of a die assembly D on the movable side. FIG. 3 illustrates the positional relationship on the movable side between the cavity 35 and a base plate 28 for the die assembly D.

The base plate 28 includes a guide member 30 at the center point thereof, and a cylindrical hole 29 adapted to be exactly fitted onto the outer peripheral surface of the guide rod 23. Cylindrical hole 29 is formed in the guide member 30 in a coaxial relationship while extending in the axial direction.

Four cylindrical holes 44 (with only one being illustrated in FIG. 3) are formed on the base plate 28 on the movable side, in an equally spaced relationship around the locus of a circle having a radius R as measured from the center of the guide member 30. Hole 44 loosely receive cylindrical projections 38, projecting outward of the cavities 35, with an annular clearance $\Delta t$ between each cylindrical hole 44 and the corresponding cylindrical projection 38. An ejector bush, a hole cutting punch, an ejector pin and an actuating mechanism for actuating these components (not shown) are incorporated in each cylindrical projection 38.

Three cylindrical holes 32 for receiving projecting bolts 39, and three cylindrical holes 33 for receiving projecting bolts 43 are formed on each cavity 35 on the movable side in an equally spaced relationship.

Each of the bolts 39 is arranged so that a gap Δh is located between the bottom surface of each cylindrical hole 32 and a head of the bolt 39. This gap Δh is preferably no greater than 0.2 mm.

Plural sets of cup washer-shaped springs 42 are inserted between the bottom surface of each cylindrical hole 33 and a head of the bolt 43. The lower surface 41 of the cavity 35 is forced into close contact with the upper surface 40 of the base plate 28 by the resilient force given by the cup washer-shaped springs 42. In other words, the cavities 35 on the movable side are forcibly brought in close contact with the base plate 28 with the aid of the cup washer-shaped springs 42.

Each cavity 35 includes a circular cavity surface 36 having a small depth, and a cylindrical male guide surface 37. Guide surface 37 is adapted to be exactly fitted into the opponent cylindrical female guide surface 26 of the cavity 24.

With this construction, the cavity 35 is fixedly secured to the base plate 28 so as to enable it to be slidably displaced on the upper surface 40 of the base plate 28 within the range defined by the annular clearance Δt of ±0.2 mm while coming in contact with the base plate 28.

The annular clearance Δt is experimentally determined with reference to a distance between the center axis of the base plate 28 and the center axis of each cavity 35, and a quantity of thermal expansion associated with the temperature difference between the base plate 20 and the base plate 28 during each molding operation. For example, if the foregoing quality of thermal expansion is set to 0.04 mm/° C., the gap Δh can be set to about 0.55 mm.

Usually, three sets of cup washer-shaped springs 42 are received in each cylindrical hole 33. If, for example, each optical disc base board is dimensioned to have an outer diameter of 120 mm or less, it is preferred that the resilient force given by the cup washer-shaped springs 42 is set to 400 to 600 Kg per each cavity 35.

Figure 4:
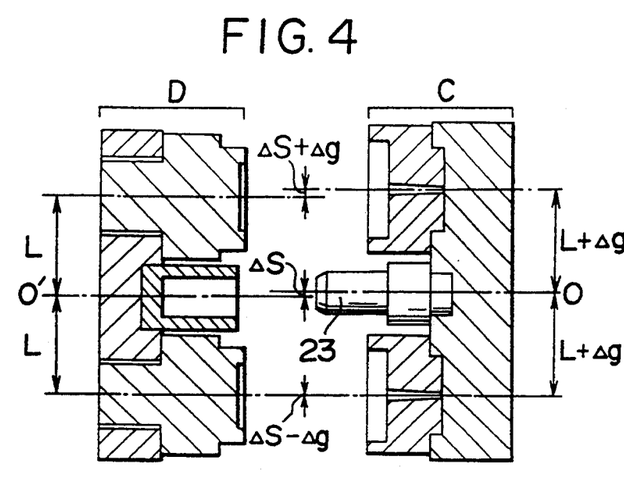
FIG. 4 is a sectional side view of the injection molding die, particularly showing a die assembly on the movable side parted away from a die assembly on the stationary side to assume a die opened state.
Figure 5:
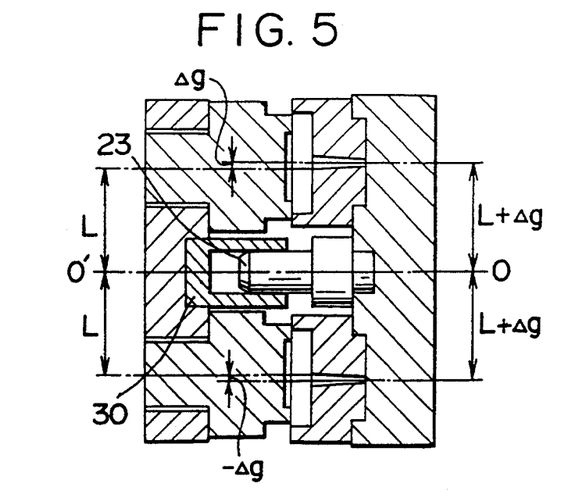
FIG. 5 is a sectional view of the injection molding die, particularly showing that the die assembly on the movable side is half engaged with the die assembly on the stationary side.
Figure 6:
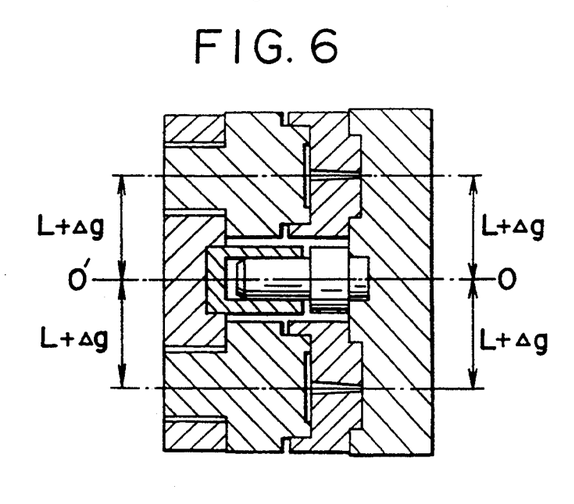
FIG. 6 is a sectional view of the injection molding die, particularly showing that the die assembly on the movable side is brought in close contact with the die assembly on the stationary side to assume a die closed state.

FIG. 4 to FIG. 6 show sectional side views of the injection molding die constructed in the above-described manner.

FIG. 4 shows that the die assembly D is separated from the die assembly C to assume a die opened state. It should be noted that the die assembly C is fixedly mounted on a stationary platen (not shown) of an injection molding machine and the die assembly D is likewise mounted on a movable platen (not shown) of the injection molding machine.

The die assembly C may have a temperature higher than that of the die assembly D because it is located in the vicinity of a heat source for the injection molding machine. Further, a hot runner block (not shown) having a temperature of about 360° C. may be incorporated in the die assembly C. If, for example, a distance between the center axis of the base plate 28 and the center axis of each cavity 35 is represented by L, and the thermal expansion of base plate 20 is represented by Δg, then a distance between the center axis of the base plate 20 and the center axis of each cavity 24 assumes a value of L+Δg.

At this time, and referring also to FIG. 10, the base plate 28 assumes a center axis O' which is dislocated from a center axis O of the base place 20 by a quantity of ΔS due to a bearing clearance Δc of base plate 28, as well as the deflection of guide rods (not shown) caused by their own dead weight.

On the aforementioned assumption, the center deviation of each cavity located on the upper half is represented by ΔS +Δg, while the center deviation of each cavity located on the lower half as seen in FIG. 4 is represented by ΔS−Δg.

FIG. 5 is a sectional side view illustrating that the base plate 28 is displaced in the rightward direction until the guide rod 23 is inserted into drilled guide hole 29. At this time, deviation of the center axis O of tire die assembly C from the center axis O' of the die assembly D is completely canceled so that the center axis 0 of the base plate 20 is coincident with the center axis O' of the base plate 28. Further, the foremost end of each cavity 35 does not come in contact with the foremost end of each cavity 24.

At this time, deviation of the center axis of each cavity 24 from the center axis of each cavity 35 assumes only a value ofΔg.

With respect to the injection molding die constructed according to the embodiment of the present invention, it should be noted that the guide rod 23 and the guide member 30 serve as all original point for the thermal expansion of the base plate 20 and the base plate 28, and moreover, they serve to stabilize the position of each cavity 24 and each cavity 35.

FIG. 6 is a sectional side view illustrating that the cavities 35 come in close contact with the cavities 24 on the stationary side to assume a die closed state. While the die closed state is maintained, the cylindrical male guide surface 37 of each cavity 35 is forcibly inserted into the cylindrical female guide surface 26 of each cavity 24 so that the cavity 35 comes in close contact with the cavity 24, thus allowing the cavity 35 to be slidably displaced relative to the cavity 24. This displacement is within the range defined by a quantity of ±Δg until the distance between the center axis of the base plate 20 and each cavity 24,side represented by L+Δg, is equalized to the distance between the center axis of the base plate 28 and each cavity 35 represented by L+Δg. At this time, there is not any positional offset of the center axis of the die assembly C from the center axis of the die assembly D.

While the foregoing positional state is maintained, a plurality of optical disc base boards, each having predetermined dimensions, call simultaneously be molded with high accuracy by operating the injection molding machine oil which the injection molding die of the present invention is fixedly mounted.

Although the present invention has been described above merely with respect to a single preferred embodiment thereof, it should of course be understood that the present invention should not be limited only to this embodiment, but various change or modification may be made without departure from the scope of the present invention as defined by the appended claims. For example, the number of cavities may be increased or decreased from four. In addition, the attitude for mounting the injection molding die mounted on the injection molding machine may be changed from the horizontal attitude to the vertical attitude. Further, guiding means for correctly locating the center axis of each cavity on the stationary side in alignment with the center axis of each cavity on the movable side should not be limited only to a combination of the cylindrical male guide surface with the cylindrical female guide surface. Alternatively, the foregoing guiding means may be constructed by a combination of a conical male guide surface plus a cylindrical male guide surface with a conical female guide surface plus a cylindrical female guide surface.

What is claimed is:

1. An injection molding machine for simultaneously molding a plurality of optical disc base boards, comprising:
- a stationary die assembly portion including a first base plate having a first center axis, and a plurality of first cavities each having a respective center axis, said first cavities being arranged in an equally spaced relationship along a circumference of a circle coaxial with the first center axis;
- a movable die assembly portion including a second base plate having a second center axis, and a plurality of second cavities each having a respective center axis, each said second cavity positionally corresponding to a respective first cavity;
- first aligning means for aligning the first center axis with the second center axis, said first aligning means including a guide rod fixedly secured to said first base plate and extending along the first center axis, and a guide member extending along the second center axis, said guide member being positionally coincident with the first center axis and having a guide hole formed therein for receiving said guide rod; and
- second aligning means for aligning each respective first cavity center axis with each corresponding respective second cavity center axis.

2. The injection molding machine according to claim 1, further including additional aligning means comprising a cylindrical female guide surface formed on each first cavity, and a cylindrical male guide surface formed on each second cavity adapted to fit into said cylindrical female guide surface.

3. An injection molding machine for simultaneously molding a plurality of optical disc base boards, comprising:
- a stationary die assembly portion including a first base plate having a first center axis, and a plurality of first cavities each having a respective center axis, said first cavities being arranged in an equally spaced relationship along a circumference of a circle coaxial with the first center axis;
- a movable die assembly portion including a second base plate having a second center axis, and a plurality of second cavities each having a respective center axis, each said second cavity positionally corresponding to a respective first cavity;
- first aligning means for aligning the first center axis with the second center axis; and
- second aligning means for aligning each respective first cavity center axis with each corresponding respective second cavity center axis, said second aligning means comprising a cylindrical projection extending outward from each said second cavity, a cylindrical hole being formed through said second base plate for receiving a corresponding cylindrical projection therein, a predetermined annular clearance being formed therebetween, the annular clearance allowing each said second cavity to be slidably displaced on said second base plate relative to said first cavity, thereby compensating for a difference in thermal expansion between said stationary die assembly portion and said movable die assembly portion.

4. The injection molding machine according to claim 3, wherein said second aligning means includes a plurality of first tightening bolts for securing each said second cavity to said second base plate with a predetermined gap between a bottom of a cylindrical hole for receiving each of said first tightening bolts therein and a head of each first tightening bolt, and a plurality of second tightening bolts for resiliently securing each said second cavity to said second base plate with plural sets of cup washer-shaped springs received between a bottom of cylindrical hole, for loosely receiving each of said second tightening bolts therein, and a head of each second tightening bolt.

5. The injection molding machine according to claim 4, wherein said first tightening bolts and said second tightening bolts are arranged along the locus of a common circle having a center axis coincident with a respective second cavity center axis.

6. The injection molding machine according to claim 3, further including additional aligning means comprising a cylindrical female guide surface formed on each first cavity, and a cylindrical male guide surface formed on each second cavity adapted to fit into said cylindrical female guide surface.

* * * * *